United States Patent [19]

Lemahieu et al.

[11] 3,957,288

[45] May 18, 1976

[54] THERMOGRAPHIC RECORDING MATERIAL

[75] Inventors: Raymond Gerard Lemahieu, Mortsel; Wilhelmus Janssens, Aarschot; Daniël Alois Claeys, Mortsel, all of Belgium

[73] Assignee: AGFA-GEVAERT N.V., Mortsel, Belgium

[22] Filed: Dec. 27, 1973

[21] Appl. No.: 428,688

[30] Foreign Application Priority Data

Dec. 28, 1972 United Kingdom ............... 59842/70

[52] U.S. Cl. ........................... 282/27.5; 260/240 F; 260/246 B; 260/247; 260/247.1 M; 260/293.71; 260/319.1; 260/326.2; 260/329 R; 260/329 AM; 260/333; 260/611 A; 428/411; 428/480; 428/537; 260/240 R; 260/247.1 P

[51] Int. Cl.[2] ........................ B32B 27/36; B41B 5/18

[58] Field of Search ............... 8/90 R; 117/1.7, 36.2, 117/36.7, 36.8, 36.9, 138.8 A, 138.8 F; 96/33, 90 R; 260/240 R, 240 E, 240 K, 240.1, 240.7, 240.65, 246 B, 247.1, 293.71, 319.1, 326.11, 326.12, 326.16; 428/411, 537; 427/144–152

[56] References Cited

UNITED STATES PATENTS

| | | | |
|---|---|---|---|
| 2,929,736 | 3/1960 | Miller et al. | 117/36.9 |
| 3,140,947 | 7/1964 | Foris | 96/48 |
| 3,310,401 | 3/1967 | Greig | 96/1.5 |
| 3,413,138 | 11/1968 | Georgalas et al. | 117/36.8 |
| 3,489,568 | 1/1970 | Hackmann et al. | 96/90 |
| 3,527,517 | 9/1970 | Hackmann | 96/90 |
| 3,544,557 | 12/1970 | Nauta | 260/239 |
| 3,594,208 | 7/1971 | Wiese et al. | 117/36.8 |
| 3,615,423 | 10/1971 | Vrancken | 96/13 |
| 3,637,675 | 1/1972 | Brust et al. | 260/240 F |
| 3,637,748 | 1/1972 | Psaar et al. | 260/326.15 |
| 3,684,510 | 8/1972 | Psaar et al. | 96/48 R |
| 3,752,825 | 8/1973 | Raue et al. | 260/326.11 |
| 3,828,071 | 8/1974 | Kast et al. | 260/326.15 |
| 3,850,913 | 11/1974 | Psaar | 260/240.8 |

FOREIGN PATENTS OR APPLICATIONS

| | | |
|---|---|---|
| 973,965 | 11/1964 | United Kingdom |
| 1,281,492 | 7/1972 | United Kingdom |
| 6,402,618 | 9/1964 | Netherlands |
| 482,224 | 1/1970 | Switzerland |

*Primary Examiner*—P. E. Willis, Jr.
*Attorney, Agent, or Firm*—William J. Daniel

[57] ABSTRACT

A thermographic recording process in which a methine dye is produced by bringing image-wise into reactive contact with the aid of heat an acid-reacting compound with a dye precursor compound corresponding to the following general formula:

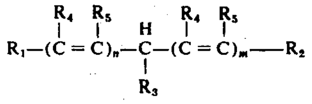

wherein:

$R_1$ represents (1) a substituted aryl group, at least one substituent of the substituted aryl group being an ether group $R_6$—O— in which $R_6$ represents a hydrocarbon group including a substituted hydrocarbon group or (2) a heterocyclic group including a substituted heterocyclic group, $R_2$ represents a substituted aryl group, at least one substituent of the substituted aryl group, being an ether group $R_6$—O—, in which $R_6$ represents a hydrocarbon group, including a substituted hydrocarbon group, a heterocyclic group including a substituted heterocyclic group, or a

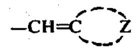

group in which Z represents the necessary atoms to close a heterocyclic nucleus including a substituted heterocyclic nucleus, $R_3$ represents (1) a —XH or —X—$R_7$ group, in which X is oxygen or sulphur and $R_7$ is an organic group, (2) a

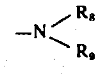

group wherein in each of $R_8$ and $R_9$ (same or different) represents hydrogen or an alkyl group, a cycloalkyl group, an aralkyl group, or an aryl group or $R_8$ and $R_9$ together represent the necessary atoms to close a nitrogen-containing heterocyclic nucleus, or (3) a

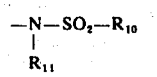

group in which $R_{10}$ represents an alkyl group including a substituted alkyl group, or a cycloalkyl group including a substituted cycloalkyl group, an aralkyl group including a substituted aralkly group, an aryl group including a substituted aryl group, a heterocyclic group including a substituted heterocyclic group and in which $R_{11}$ represents hydrogen or represents a group enumerated in the definition of $R_{10}$, or $R_{11}$ and $R_{10}$ together represent a sultam group, each of $R_4$ and $R_5$ (same or different) represents hydrogen, a $C_1$-$C_5$ alkyl group, a cycloalkyl group, an aralkyl group or an aryl group,

*n* is 0 or 1, and

*m* is 0 or 1.

28 Claims, No Drawings

THERMOGRAPHIC RECORDING MATERIAL

The present invention relates to heat-sensitive materials suited for the recording and/or reproduction of information and to recording processes wherein such materials are used.

In common thermography a heat-sensitive sheet is brought into face to face contact with a graphic original that carries an image formed of infrared radiation absorbing material. When the original is exposed to infrared radiation, the image portions thereof are heated selectively and cause development in the adjacent heat-sensitive sheet of a colour pattern corresponding to the original.

Transfer by heat of reactant materials to a receptor sheet has been described, e.g., in the United Kingdom Pat. No. 973,965 filed Sept. 29, 1960 by Minesota Mining Manufacturing and in the U.S. Pat. Nos. 2,770,534 of Walter S. Marx, Jr. issued Nov. 13, 1956 and 3,476,578 of Eric Maria Brinckman issued Nov. 4, 1969.

Heat-sensitive copy sheets that change colour when heated and in which the dye-forming reaction is based on the reaction of an acid-reacting compound with a dye precursor compound, have been described in the Dutch Patent Application No. 64/02,618 filed Mar. 12, 1964 by Allied Chem. Corp.

From the U.S. Pat. No. 3,594,208 of Joseph A. Wiese, Jr. and Donald J. Williams issued July 20, 1971 it is further known to prevent premature reaction between a dye precursor and a proton-producing compound by applying the dye precursor compound in a binder layer different from the binder layer containing an acid. In practice, the acid-containing coating is applied as an outermost layer from a solution in a volatile liquid vehicle, which is a non-solvent for the vinyl chloride polymer acting as binder for the dye precursor, the layer comprising the dye precursor being applied as the first coating to the support.

The dye precursors used in such integral copy sheet having a dual coating are N-bis(p-dialkylaminoaryl)methane derivatives. Many of these derivatives are not completely colourless so that images having a slightly coloured image background are obtained therewith.

An important demand for copying materials intended for projection purposes is the production of highly fade-resistant dye images, i.e. dye images, the dyes of which withstand continuous exposure to light as applied e.g. in an overhead projector.

There has now been found a thermographic recording process in which methine dye salts of various colours are produced by bringing image-wise into reactive contact with the aid of heat an acid-reacting compound with a dye precursor compound corresponding to the following general formula:

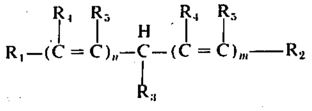

wherein:

$R_1$ represents (1)a substituted aryl group e.g. a substituted phenyl, tolyl, xylyl, naphthyl, biphenyl, or indenyl group at least one substituent of said aryl group being an ether group $R_6$—O— in which $R_6$ represents a hydrocarbon group including a substituted hydrocarbon group, e.g. an alkyl group including a substituted alkyl group, e.g. a methyl, ethyl, propyl, hexyl, dodecyl, or octadecyl group, a cycloalkyl group including a substituted cycloalkyl group e.g. a cyclopentyl, cyclohexyl, or methylcyclohexyl group, an aralkyl group including a substituted aralkyl group e.g. a benzyl or phenethyl group, an aryl group including a substituted aryl group e.g. a phenyl group or tolyl group or (2)a heterocyclic group including a substituted heterocyclic group e.g. an indolyl, pyrryl, thienyl, furyl, carbazolyl or indolizinyl group, the thienyl group being preferably substituted with a N-morpholinyl group, $R_2$ represents a substituted aryl group e.g. a substituted phenyl, tolyl, xylyl, naphthyl, biphenyl or indenyl group, at least one substituent of said groups being an ether group $R_6$-O-, in which $R_6$ represents a hydrocarbon group including a substituted hydrocarbon group, e.g. an alkyl group including a substituted alkyl group, e.g. a methyl, ethyl, propyl, hexyl, dodecyl, or octadecyl group, a cycloalkyl group including a substituted cycloalkyl group e.g. a cyclopentyl, cyclohexyl, or methylcyclohexyl group, an aralkyl group including a substituted aralkyl group e.g. a benzyl or phenethyl group, an aryl group including a substituted aryl group e.g. a phenyl group or tolyl group or a heterocyclic group including a substituted heterocyclic group e.g. an indolyl, pyrryl, thienyl, furyl, carbazolyl, or indolizinyl group, the thienyl group being preferably substituted with a N-morpholinyl group, or a —CH=C Z group in which Z represents the necessary atoms to close a heterocyclic nucleus including a substituted heterocyclic nucleus e.g. a nitrogen-containing heterocyclic nucleus, the indolylidene-(2) group being an example thereof, $R_3$ represents (1) a —XH or —X—$R_7$ group, in which X is oxygen or sulphur and $R_7$ is an organic group e.g. an alkyl group including a substituted alkyl group e.g. methyl, a cycloalkyl group including a substituted cycloalkyl group e.g. a cyclohexyl group, an aralkyl group including a substituted aralkyl group e.g. a benzyl group, an aryl group including a substituted aryl group e.g. a phenyl group, or an heterocyclic group including a substituted heterocyclic group, (2) a

group wherein each of $R_8$ and $R_9$ (same or different) represents hydrogen or an alkyl group e.g. a $C_1$–$C_5$ alkyl group, a cycloalkyl group, an aralkyl group, or an aryl group or $R_8$ and $R_9$ together represent the necessary atoms to close a nitrogen-containing heterocyclic nucleus e.g. a piperidine, pyrrolidine, or morpholine nucleus, or (3) a

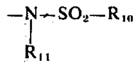

group in which $R_{10}$ represents an alkyl group including a substituted alkyl group e.g. methyl, propyl, hexyl, dodecyl, or octadecyl, or a cycloalkyl group including a substituted cycloalkyl group e.g. cyclopentyl, cyclohexyl, or methylcyclohexyl, an aralkyl group including a substituted aralkyl group e.g. benzyl or phenethyl, an aryl group including a substituted aryl group e.g. a phenyl, tolyl, xylyl, naphthyl, biphenyl or indenyl group, a heterocyclic group including a substituted heterocyclic group e.g. a pyridyl, quinolyl, benzothiazolyl, or phenothiazolyl group; the substituents being e.g. alkoxy, fluoro, chloro, bromo, dialkylamino, acylamino, or sulphamyl and in which $R_{11}$ represents hydrogen or represents a group enumerated in the definition of $R_{10}$, or $R_{11}$ and $R_{10}$ together represent a sultam group, each of $R_4$ and $R_5$ (same or different) represents hydrogen, a $C_1$-$C_5$ alkyl group, cycloalkyl group, an aralkyl group e.g. benzyl or an aryl group e.g. a phenyl group,

*n* is 0 or 1, and

*m* is 0 or 1.

The dye precursor compounds involved do not contain acid substituents.

Representatives of particularly suitable dye precursor compounds are given in the following table.

Table

| No. | Dye precursor compound | Melting point °C |
|---|---|---|
| 1 | 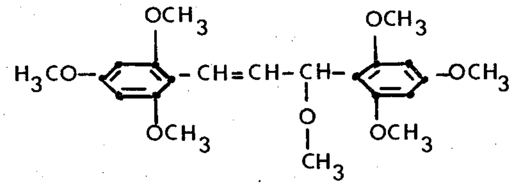 | 160 |
| 2 | 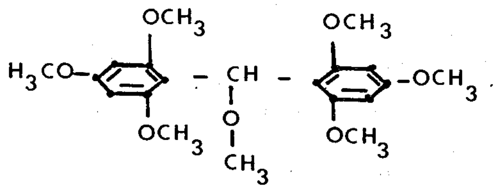 | 150 |
| 3 | 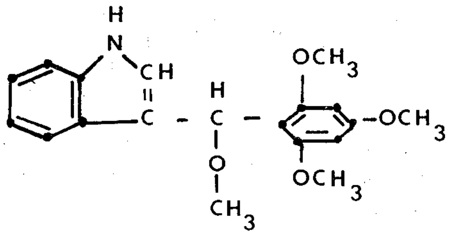 | 150 (decomp.) |
| 4 | 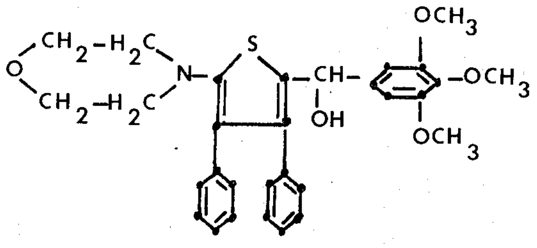 | 160 |
| 5 | 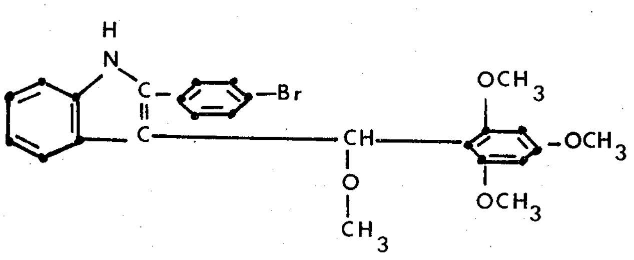 | 100 (decomp.) |

Table —Continued
| No. | Dye precursor compound | Melting point °C |
|---|---|---|
| 6 | 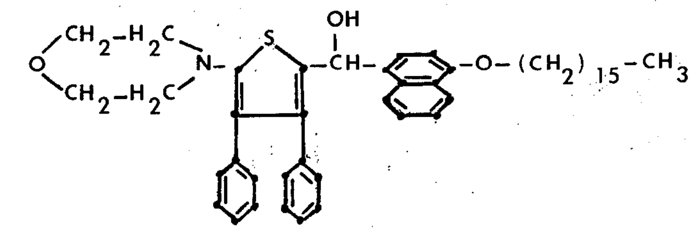 | 145 |
| 7 | 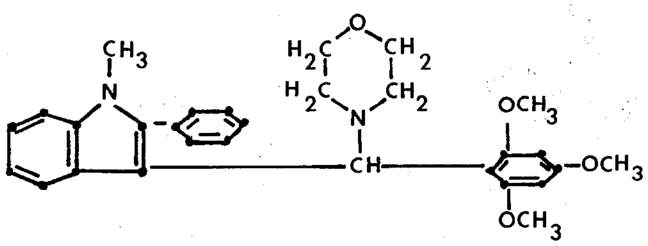 | 204 |
| 8 | 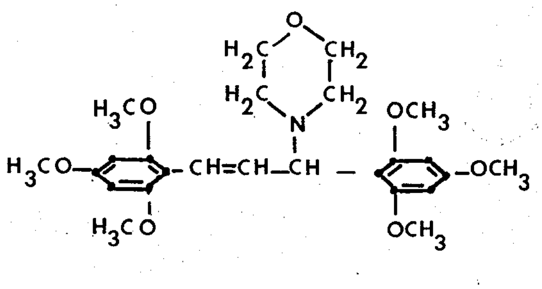 | 124 |
| 9 | 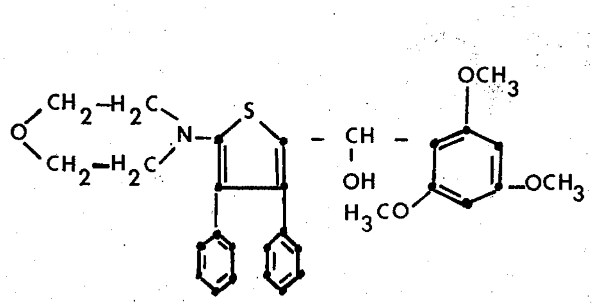 | 140 |
| 10 | 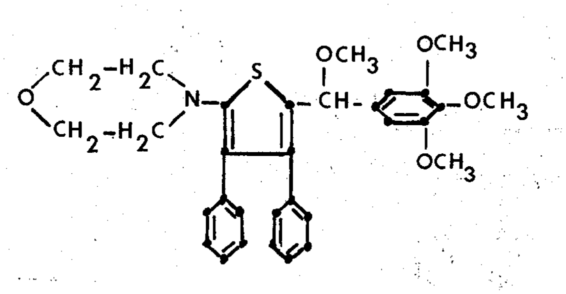 | 161 |
| 11 | 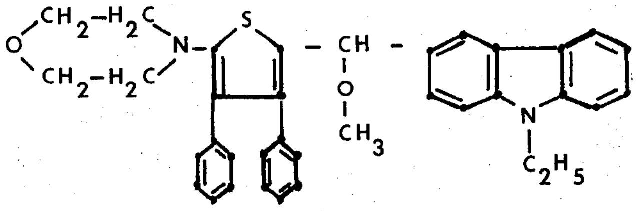 | 175 |

Table —Continued
| No. | Dye precursor compound | Melting point °C |
|---|---|---|
| 12 | 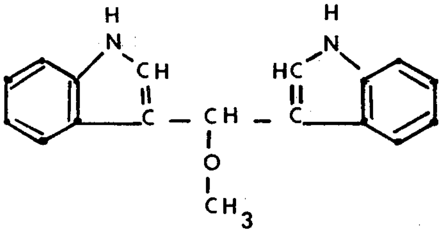 | 150 |
| 13 | 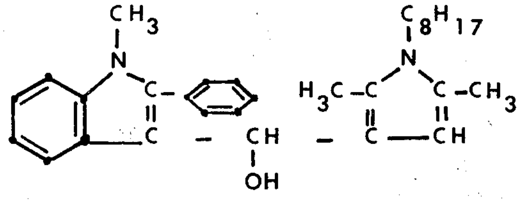 | 70 (decomp.) |
| 14 | 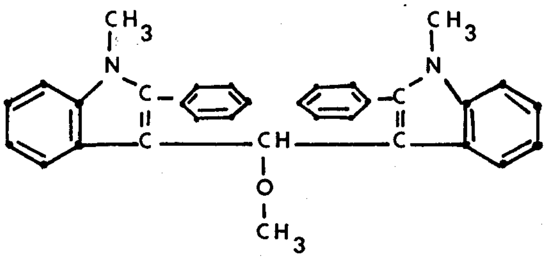 | 216 |
| 15 | 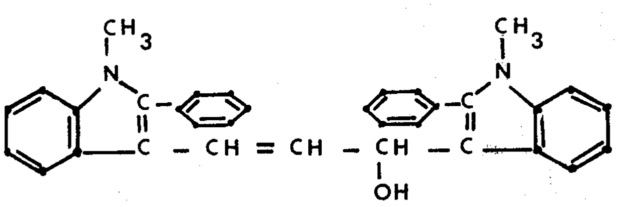 | 140 (decomp.) |
| 16 | 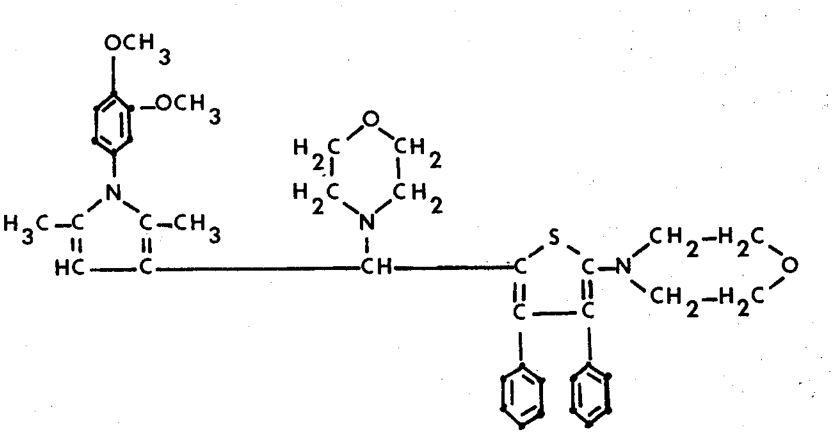 | 192 |

Table —Continued
| No. | Dye precursor compound | Melting point °C |
|---|---|---|
| 17 | 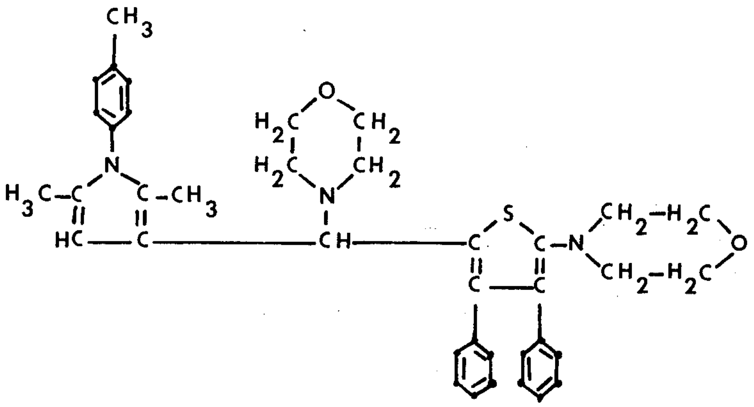 | 198 |
| 18 | 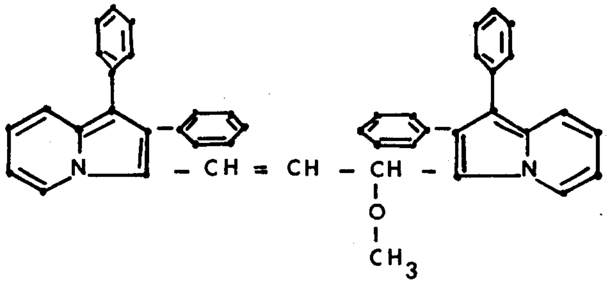 | 177 |
| 19 | 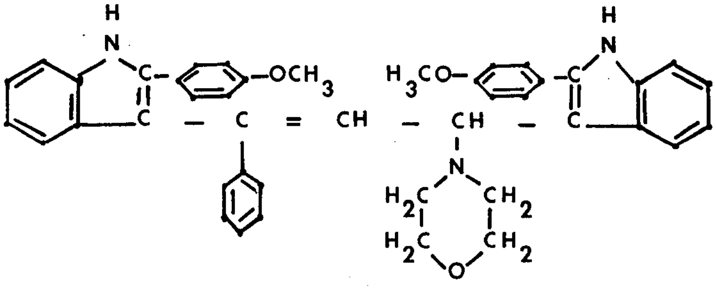 | 135 |
| 20 | 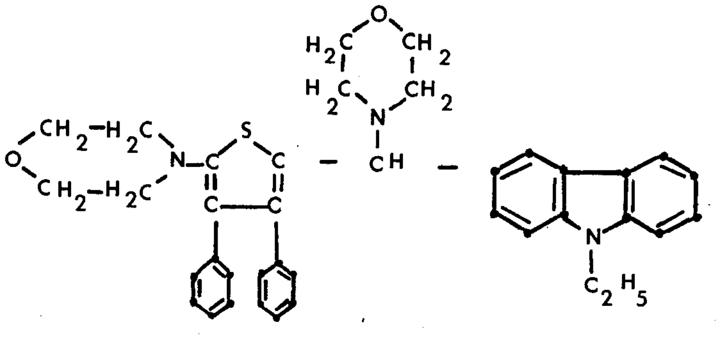 | 150 |

Table —Continued
| No. | Dye precursor compound | Melting point °C |
| --- | --- | --- |
| 21 | 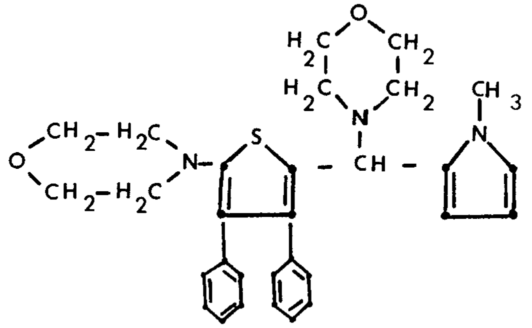 | 176 |
| 22 | 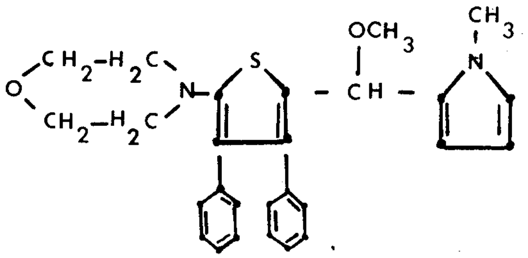 | 125 |
| 23 | 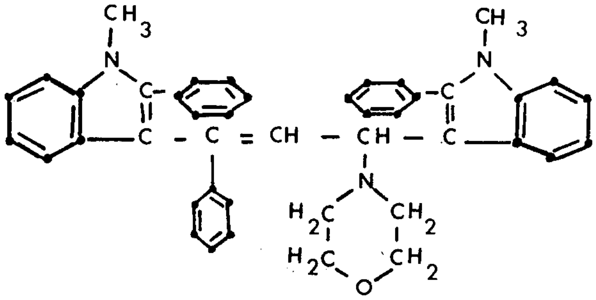 | 198 |
| 24 | 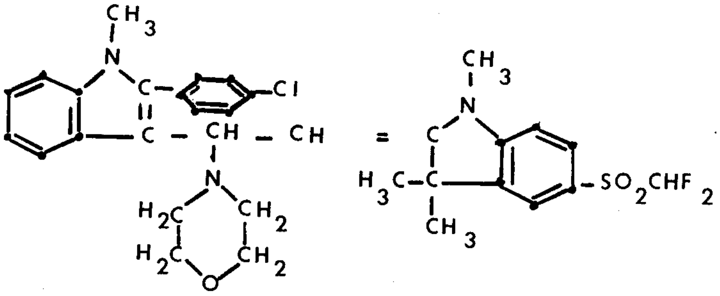 | 150 |
| 25 | 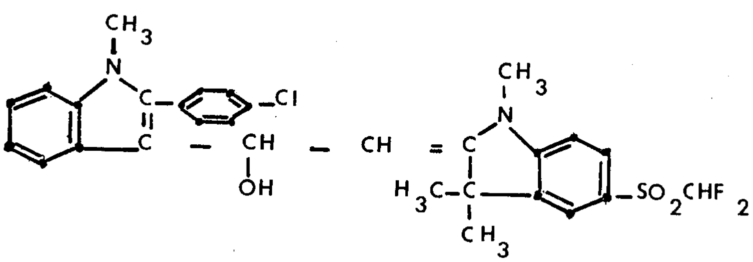 | 210 |

Table —Continued
| No. | Dye precursor compound | Melting point °C |
| --- | --- | --- |
| 26 | 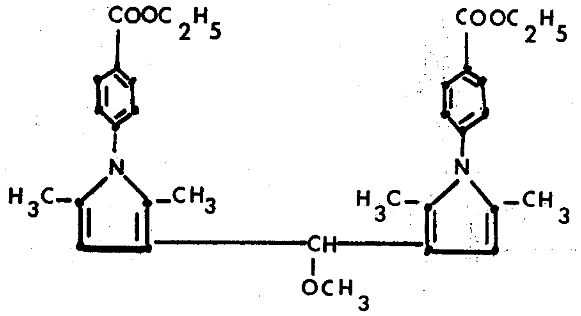 | 100 (decomp.) |
| 27 | 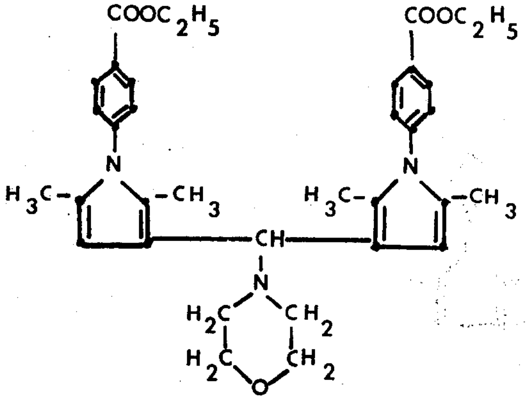 | 100 (decomp.) |
| 28 | 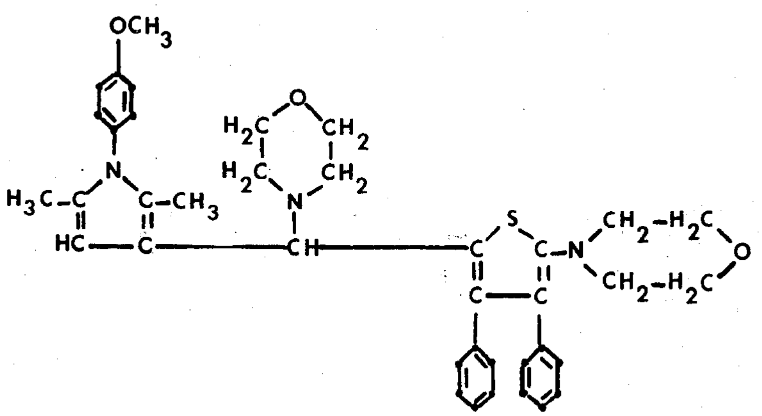 | 154 |
| 29 | 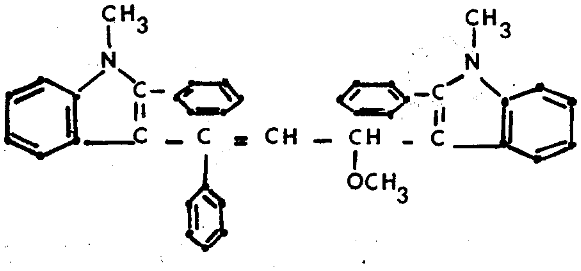 | 140 |

Table —Continued

| No. | Dye precursor compound | Melting point °C |
|---|---|---|
| 30 | 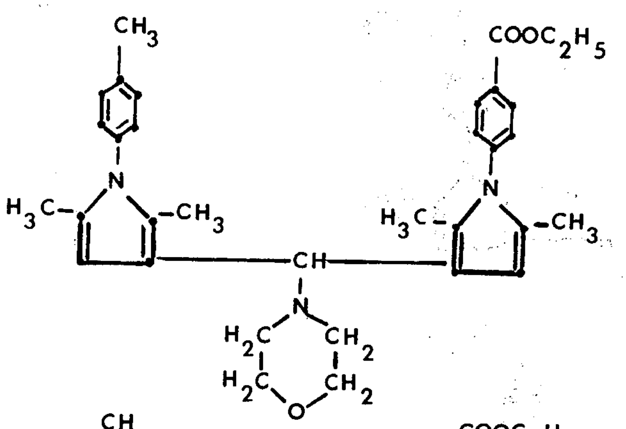 | 135 |
| 31 | 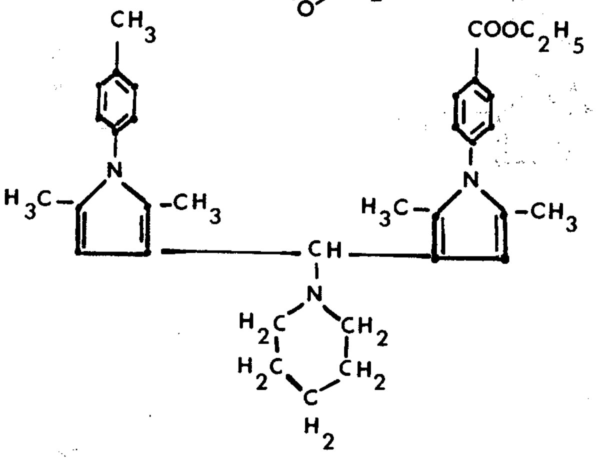 | 120 |
| 32 | 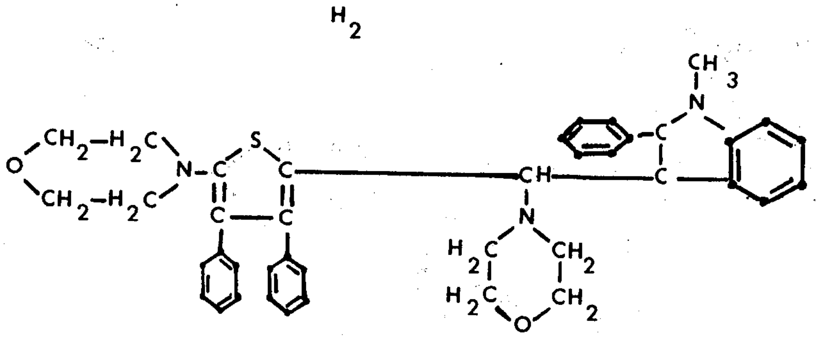 | 162 |
| 33 | 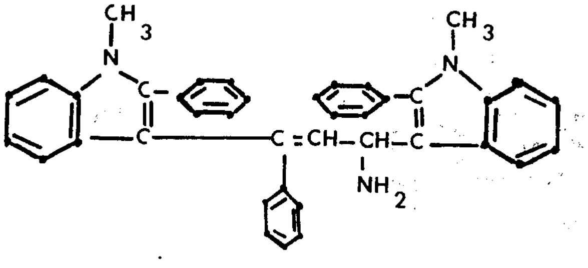 | 140 – 150 (decomp.) |

The preparation of the dye precursor compounds is illustrated by the following detailed preparation receipts.

1. Preparation of dye precursor compund 1

At 15°C 500 ml of ethanol saturated with hydrogen chloride gas were added dropwise to a solution of 168 g (1 mole) of 1,3,5-trimethoxybenzene and of 90 g (0.55 mole) of malondialdehyde tetramethylacetal in 500 ml of dry ethanol. The dyestuff corresponding to the dye precursor compound crystallized in the reaction mixture. After separation the dyestuff was first washed with a mixture of ethanol and ether (1:9 by volume) and subsequently with ether alone.

Yield: 204 g.

1300 ml of a 10% by weight aqueous sodium carbonate solution were added with stirring to 120 g of the dyestuff dissolved in a mixture of 1000 ml of methylene chloride and 200 ml of methanol. The reaction mixture became colourless and the dye precursor compound (leuco base) dissolved into the organic liquid phase.

The organic phase was separated and dried with anhydrous potassium carbonate. Subsequently the solvent was distilled off. The leuco base was recrystallized from acetonitrile.

Yield: 59.7 g.

Melting point: 160°C.

(The preparation of the dyestuff has been described already, see G. Zinner and R. Uhlig, Angew.Chem. (1961) No. 13, page 467–468).

2. Preparation of dye precursor compound 2

At 10°C 375 ml of ethanol saturated with hydrogen chloride were added dropwise to a solution of 42 g (0.25 mole) of 1,3,5-trimethoxybenzene and 49 g (0.25 mole) of 2,4,6-trimethoxybenzaldehyde. The dyestuff that crystallized in the reaction mixture was sucked off and washed first with a small amount of cold ethanol and afterwards with ether.

Yield: 55.2 g.

Melting point: approximatively 140°C.

45.2 g of the obtained dyestuff were dissolved in a mixture of 450 ml of methylene chloride and of 45 ml of methanol and converted into the colourless leuco form by mixing it with a 675 ml of a 10% by weight aqueous solution of sodium carbonate. The leuco base passed into the organic phase. The solvent was evaporated. The residue left contained the leuco base.

Yield: 26 g.

Melting point: 150°C.

3. Preparation of dye precursor compound 3

10 g of anhydrous zinc chloride were added to a mixture of 4.35 g (0.03 mole) of 3-formylindole and of 5.5 g (0.033 mole) of 1,3,5-trimethoxybenzene dissolved in 50 ml of acetic anhydride. The reaction mixture was stirred at room temperature (20°C) for 1 hour. The dyestuff that crystallized was sucked off and washed with water.

Yield: 8.9 g.

Melting point: 210°C (decomposition).

8.5 g of the obtained dyestuff were dispersed in 100 ml of methylene chloride. 20 ml of methanol and 2.6 g of potassium hydroxide were added to the dispersion. The colourless methylene chloride solution obtained was washed with water and dried over anhydrous potassium carbonate. Finally the solvent was distilled off to leave the leuco base.

Yield: 5.8 g.

Melting point: 150°C (decomposition).

4. Preparation of dye precursor compound 4

80 g (0.25 mole) of 2-morpholino-3,4-diphenylthiophene and 49 g (0.25 mole) of 3,4,5-trimethoxybenzaldehyde were dissolved with stirring in 625 ml of dry ethanol saturated with hydrogen chloride. After stirring of the reaction mixture for 1 hour the precipitated dyestuff was sucked off.

Yield: 114.5 g.

Melting point: approximatively 220°C.

4 g of the obtained dyestuff were dissolved in 40 ml of methylene chloride. The solution was discoloured by shaking with 60 ml of an aqueous 10% by weight sodium carbonate solution. The colourless methylene chloride solution was dried with anhydrous potassium carbonate and the solvent was distilled off to leave the carbinol base.

Yield: 3 g.

Melting point: 160°C.

5. Preparation of dye precursor compound 5

At room temperature 5 g of anhydrous zinc chloride were added to a mixture of 5.1 g (0.017 mole) of 2-(p-bromophenyl-3-formylindole and of 2.9 g (0.017 mole) of 1,3,5-trimethoxybenzene dissolved in 50 ml of acetic anhydride. The reaction mixture was stirred for 1 hour at room temperature. The dyestuff that crystallized from the reaction mixture was sucked off and washed with water.

Yield: 7 g.

The dyestuff was dissolved in a mixture of 100 ml of methylene chloride and 20 ml of methanol. 3 g of potassium hydroxide were added thereto. Water was added to the solution obtained. Subsequently the organic phase was dried with anhydrous potassium carbonate. The solvent was distilled off to obtain the leuco base.

Yield: 5.1 g.

6. Preparation of dye precursor compound 6

10 g of anhydrous zinc chloride were added to a mixture of 6.4 g (0.02 mole) of 2-morpholino-3,4-diphenylthiophene and 8 g (0.02 mole) of 4-hexadecyloxy-naphthaldehyde dissolved in 100 ml of acetic anhydride. The reaction mixture was stirred for 1 hour at room temperature. Subsequently, the reaction mixture was poured on ice.

The sticky precipitate was treated with methanol and sodium perchlorate to form the crystalline perchlorate dye salt.

Methylene chloride and an aqueous ammonia solution were added to the perchlorate salt. The organic phase was dried with potassium carbonate and the solvent was evaporated.

Yield: 2.1 g.

7. Preparation of dye precursor compound 7

9.8 g (0.05 mole) of 2,4,6-trimethoxybenzaldehyde were added portion-wise to a solution of 10.35 g (0.05 mole) of 1-methyl-2-phenylindole in a mixture of 75 ml of ethanol and 75 ml of ethanol saturated with hydrogen chloride. During the addition of the benzaldehyde derivative the reaction mixture was stirred and kept at 15°C by cooling.

After a reaction period of 2 hours a solution of 12.5 g of sodium perchlorate in 50 ml of methanol was added. The crystallized dyestuff was separated and recrystallized from ethanol.

Yield: 11 g.

Melting point: 204°C.

To 5 g of the dyestuff dissolved in 50 ml of methylene chloride 2.5 ml of morpholine were added. After washing with water and drying with potassium carbonate the solvent was evaporated.

Yield: 4.3 g.

Melting point: 204°C

8. Preparation of dye precursor compound 8

10 g of the dyestuff prepared as described in preparation 1 were dissolved in 100 ml of methylene chloride and allowed to react with 5 ml of morpholine. After evaporating the solvent the obtained solid was recrystallized from ethanol.

Yield: 4 g.

Melting point: 124°C

9. Preparation of dye precursor compound 9

9.8 g (0.05 mole) of 2,4,6-trimethoxybenzaldehyde were added portion-wise to a solution of 16 g (0.05 mole) of 2-morpholino-3,4-diphenyl-thiophene in a mixture of 100 ml of ethanol and 100 ml of ethanol saturated with hydrogen chloride. During the addition of the benzaldehyde derivative the reaction mixture was stirred and kept at 15°C. The crystallized dyestuff was separated.

Yield: 19.1 g.

Melting point: 120°C.

To 6 g of the dyestuff dissolved in 100 ml of methylene chloride 20 ml of a concentrated aqueous ammonia solution were added. The organic phase was separated, dried with potassium carbonate and the solvent evaporated.

Yield: 5 g.

Melting point: 140°C

10. Preparation of dye precursor compound 10

To 80 g of the dyestuff prepared as described in preparation 4 and dissolved in 400 ml of methanol 50 ml of triethylamine were added. The formed dye precursor compound was separated and washed with water and methanol.

Yield: 56.2 g.

Melting point: 161°C.

11. Preparation of dye precursor compound 11

84 ml of concentrated sulphuric acid were added dropwise to 500 ml of methanol while cooling the mixture. 124 g (0.36 mole) of 2-morpholino-3,4-diphenyl-thiophene were added to the mixture obtained. 80.4 g of N-ethyl-3-formylcarbazole dissolved in 750 ml of methanol were added dropwise with thorough stirring to the solution obtained at a temperature between 10° and 15°C over a period of 2 hours. The reaction mixture was kept at room temperature for a further 2 hours, thereupon cooled down, whereafter the crystals obtained were sucked off. The resulting precipitate was washed three times with 400 ml of water.

Yield of dyestuff: 194 g.

Melting point: 236°C.

150 g of the obtained dyestuff were dispersed into a mixture of 500 ml of methylene chloride and of 50 ml of methanol. Then 250 g of aqueous ammonia were added to the mixture with cooling. The organic phase was separated and dried with anhydrous potassium carbonate. The solvent was evaporated and the residue digested in benzine.

Yield of the leuco base: 130 g.

Melting point: 175°C.

12. Preparation of dye precursor compound 12

13.6 g of anhydrous zinc chloride were added to a mixture of 5.9 g (0.05 mole) of indole and 8.7 g (0.05 mole) of 3-formylindole dissolved in 100 ml of acetic anhydride. The reaction mixture was kept at room temperature for 1 hour, thereupon cooled down and the dye crystals formed were sucked off, washed with water, and dried.

Yield: 9.2 g.

9 g of the dyestuff obtained were dissolved in a mixture of 100 ml of methylene chloride and 20 ml of methanol and treated with 20 ml of an aqueous concentrated ammonia solution. After drying of the organic phase with anhydrous potassium carbonate the solvent was evaporated and the colourless leuco base was obtained.

Yield: 6.5 g.

Melting point: 150°C.

13. Preparation of dye precursor compound 13

13.6 g of anhydrous zinc chloride were added to a mixture of 11.75 g (0.05 mole) of 1-octyl-2,5-dimethyl-3-formylpyrrole and of 10.35 (0.05 mole) of 1-methyl-2-phenylindole dissolved in 50 ml of acetic anhydride. The reaction mixture was kept for 1 hour at 20°C. Subsequently the mixture was poured into 200 ml of water containing 20 g of sodium perchlorate. The crystalline dyestuff obtained was sucked off and washed with water.

Yield: 25.6 g.

8 g of this dyestuff were dissolved in 50 ml of methylene chloride and treated with 10 ml of a 10% by weight aqueous potassium hydroxide solution. The organic phase was dried on anhydrous potassium carbonate, the solvent was evaporated and the colourless carbinol base was obtained.

Yield: 6 g.

Melting point: approximatively 70°C (decomposition).

14. Preparation of dye precursor compound 14

13.6 g of anhydrous zinc chloride were added to a mixture of 10.4 g (0.05 mole) of 1-methyl-2-phenylindole and 11.8 g (0.05 mole) of 1-methyl-2-phenyl-3-formyl indole dissolved in 100 ml of acetic anhydride. The reaction mixture was kept at 20°C for 2 hours. Subsequently the reaction mixture was poured into a solution of 20 g of sodium perchlorate in 100 ml of methanol. The dyestuff formed was sucked off and recrystallized from methanol.

Yield: 15.9 g.

Melting point: 250°C.

8 g of the dyestuff were dissolved in 100 ml of a mixture of methylene chloride and 20 ml of methanol and treated with 30 ml of a 10% by weight solution of potassium hydroxide. The liquid organic phase was separated and dried over anhydrous potassium carbonate. The solvent was evaporated and the residue washed with benzine.

Yield: 3.2 g.

Melting point: 216°C.

15. Preparation of dye precursor compound 15

2.2 ml of an aqueous concentrated hydrogen bromide solution were added to a mixture of 4.12 g (0.02 mole) of 1-methyl-2-phenylindole and of 1.64 g (0.01 mole) of malonaldehyde tetramethylacetal in 25 ml of ethanol. The reaction mixture was heated to boiling temperature and cooled down by pouring it into ice-water. The dyestuff crystallized and was sucked off and washed with benzene and ether. The dyestuff was recrystallized from methanol.

Yield: 3.6 g.

Melting point: 250°C.

2.5 g of the dyestuff were dissolved in 50 ml of methylene chloride and treated with 10 ml of a 10% by weight aqueous solution of potassium hydroxide.

The organic phase was dried with anhydrous potassium carbonate and afterwards the solvent was evaporated.

Yield: 2 g.

Melting point: 140°C (decomposition).

16. Preparation of dye precursor compound 16

17.5 g (0.05 mole) of 2-morpholino-3,4-diphenyl-5-formyl-thiophene were added portion-wise to a solution of 11.6 g (0.05 mole) of 1-(3,4-dimethoxyphenyl)-2,5-dimethyl- pyrrole in a mixture of 75 ml of ethanol and 75 ml of ethanol saturated with hydrogen chloride. During the addition of the thiophene derivative the reaction mixture was stirred and kept at 15°C.

After a reaction period of 2 hours a solution of 12.5 g of sodium perchlorate in 50 ml of methanol was added. The crystallized dyestuff was separated.

Yield: 28.2 g.

Melting point: 230°C.

6 g of the obtained dyestuff were dissolved in 100 ml of methylene chloride and allowed to react with 5 ml of morpholine. After evaporating the solvent the dye precursor compound was recrystallized from ethanol.

Yield: 5.6 g.

Melting point: 192°C.

17. Preparation of dye precursor compound 17

The preparation of said compound proceeded analogously to the preparation of compound 16.

Melting point: 198°C.

18. Preparation of dye precursor compound 18

6.1 g (0.032 mole) of malondialdehyde tetramethyl acetal dissolved in 75 ml of ethanol were added at room temperature to 20 g (0.074 mole) of 1,2-diphenylindolizine dissolved in 50 ml of ethanol saturated with hydrogen chloride. The reaction mixture was heated to boiling temperature and maintained at that temperature for 90 min. The dyestuff crystallized and was separated from the cooled mixture.

Yield: 22.4 g.

Melting point: beyond 250°C.

10 g of the dyestuff were dissolved in 10 ml of methylene chloride and 10 ml of methanol and to the obtained solution 10 g of sodium hydroxide dissolved in 20 ml of water were added. After agitating the mixture the liquid organic phase was separated and dried with anhydrous potassium carbonate. The solvent of the organic phase was distilled off and the solid residue left was boiled with ethanol.

Yield: 177 g.

Melting point: 177°C.

19. Preparation of dye precursor compound 19

6.7 g (0.033 mole) of 3-phenyl-propiolic aldehyde diethyl acetal dissolved in 50 ml of ethanol were added dropwise to 15 g (0.066 mole) of 2-p-methoxyphenylindole dissolved in a mixture of 75 ml of ethanol and 50 ml of ethanol saturated with hydrogen chloride gas.

After a reaction period of 2 hours the crystalline dyestuff was separated by suction and washed with a small amount of ethanol.

Yield: 18.2 g.

Melting point: beyond 250°C.

5 g of the obtained dyestuff were dissolved in 100 ml of methylene chloride and allowed to react with 5 ml of morpholine. After evaporating the solvent the residue was washed with water.

Yield: 5 g.

Melting point: 135°C.

20. Preparation of dye precursor compound 20

To 6 g of the dyestuff prepared as described in preparation 1 and dissolved in 100 ml of methylene chloride 3 ml of morpholine were added. The solvent was evaporated and the residue washed with water and with methanol.

Yield: 5.8 g.

Melting point: 150°C.

21. Preparation of dye precursor compound 21

The preparation of said dye precursor compound proceeded analogously to the preparation of compound 16.

Melting point: 176°C.

22. Preparation of dye precursor compound 22

20.1 g of dyestuff prepared as starting compound for the preparation of dye precursor compound 21 were dissolved in a mixture of 150 ml of methylene chloride and 50 ml of methanol. To the obtained solution 11.9 ml of triethanolamine were added dropwise.

The obtained reaction mixture was poured into water. The organic phase was separated and dried with anhydrous potassium carbonate. After evaporating the solvent the dye precursor compound was recrystallized from a mixture of methanol and isopropanol (1:1 by volume).

Yield: 8.5 g.

Melting point: 125°C.

23. Preparation of dye precursor compound 23

12.24 g (0.06 mole) of 3-phenyl-propiolic aldehyde dissolved in 50 ml of ethanol were added dropwise to 25 g (0.12 mole) of 1-methyl-2-phenylindole dissolved in a mixture of 75 ml of ethanol and 25 ml of ethanol saturated with hydrogen chloride gas. The reaction mixture was cooled down to 0°C, whereupon the dyestuff crystallized.

Yield: 24.2 g.

Melting point: 235°C.

6 g of dyestuff were dissolved in 100 ml of methylene chloride and allowed to react with 6 ml of morpholine. The solvent was evaporated and the residue washed with water and methanol.

Yield: 5.9 g.

Melting point: 198°C.

24. Preparation of dye precursor compound 24

4.15 g (0.01 mole) of 1,2,3,3-tetramethyl-5difluoromethylsulfonylindoleninium iodide and 2.7 g (0.01 mole) of 1-methyl-2-p-chlorophenyl-3-formylindole were boiled for 10 min in 30 ml of acetic anhydride. The dyestuff crystallized.

Recrystallization of the dyestuff precipitate was effected with a mixture of acetone and methanol (1:1 by volume).

Yield: 3 g.

Melting point: beyond 250°C.

To a solution of 5 g of dyestuff in 100 ml of methylene chloride 10 ml of morpholine were added. The mixture was washed with water and the organic phase dried with potassium carbonate. Then the solvent was evaporated.

Yield: 4.5 g.
Melting point: 150°C.

25. Preparation of dye precursor compound 25

5 g of dyestuff prepared as described in preparation 24 were dissolved in 100 ml of methylene chloride and treated with 30 ml of aqueous 5 N sodium hydroxide solution. The organic phase was dried with anhydrous potassium carbonate and thereupon the solvent distilled off.
Yield: 3 g.
Melting point: 210°C.

26. Preparation of dye precursor compound 26

A solution of 27.1 g (0.1 mole) of 1-p-carbethoxyphenyl-2,5-dimethyl-4-formyl-pyrrole in 200 ml of ethanol were dropwise added to a mixture of 24.3 g (0.1 mole) of 1-p-carbethoxyphenyl-2,5-dimethylpyrrole and 20 ml of perchloric acid (70% aqueous solution) dissolved in 160 ml of ethanol. During the addition the temperature of the reaction mixture was kept at 10°C. The crystallized dyestuff was separated and washed with ethanol and ether.
Yield: 52 g.
Melting point: 218°–223°C.

19.6 g of dyestuff were dissolved in a mixture of 120 ml of methylene chloride and 40 ml of methanol and 9 ml of triethylamine added thereto. The obtained colourless solution was poured into water. The organic phase was dried with anhydrous sodium carbonate and the solvent evaporated.
Yield: 16 g.
Melting point: 100°C (decomposition).

27. Preparation of dye precursor compound 27

To 19.7 g of dyestuff prepared as described in preparation 26 and dissolved in 150 ml of methylene chloride 5.8 ml of morpholine were added dropwise. The colourless solution was poured into water. After separating the organic phase and drying it with anhydrous sodium carbonate the solvent was evaporated.
Yield: 16 g.
Melting point: 100°C (decomposition)

28. Preparation of dye precursor compound 28

The dye precursor compound has been prepared analogously to preparation 16.
Melting point: 154°C.

29. Preparation of dye precursor compound 29

To 6 g of dyestuff prepared as described in preparation 23 and dissolved in a mixture of 80 ml of methylene chloride and 20 ml of methanol 6 ml of triethylamine were added. The reaction mixture was poured into water. The organic phase was dried with anhydrous sodium carbonate and the solvent evaporated. The residue was washed with methanol.
Yield: 4.3 g.
Melting point: 140°C.

30. Preparation of dye precursor compound 30

While keeping the temperature of the reaction mass at 10°C a solution of 30 g (0.11 mole) of 1-(p-carbethoxy-phenyl) 2,5-dimethyl-3-formylpyrrole in 100 ml of ethanol were added dropwise to a solution of a mixture of 20.4 g (0.11 mole) of 1-(p-tolyl)-2,5-dimethylpyrrole and 22 ml of a 70% aqueous solution of perchloric acid dissolved in 160 ml of ethanol. The crystallized dyestuff was separated and washed with diethylether.
Yield: 51 g.
Melting point: 150°–155°C (decomposition).

To a solution of 16.1 g of the dyestuff dissolved in 120 ml of methylene chloride 5.2 ml of morpholine were added dropwise. The obtained colourless solution was poured into water. The organic phase was dried with anhydrous sodium carbonate and the solvent removed. The residue was digested with methanol.
Yield: 6.3 g.
Melting point: 135°C.

31. Preparation of dye precursor compound 31

To 16.1 g of dyestuff prepared as described in preparation 30 and dissolved in 120 ml of methylene chloride 5.9 g of piperidine were added dropwise. The obtained colourless solution was poured in water. The organic phase was separated and dried with anhydrous sodium carbonate and the solvent evaporated. The residue was digested with methanol.
Yield: 7 g.
Melting point: 120°C.

The aromatic and heterocyclic aldehydes used in the above described preparations have been prepared by the Vilsmeyer reaction which reaction has been described e.g. by Donald J. Cram and George S. Hammond in "Organic Synthesis"— 2nd Edition (1964) Mc Graw-Hill Book Company Ind. New York — p. 446–447 and by Houben-Weyl in Methoden der Organische Chemie Vol. III, part 1, p.30.

As an example of the synthesis of said aldehydes the following preparation is given in detail :

Preparation of 1-methyl-2-phenyl-3-formyl-indole.

To 150 ml of dimethylformamide 46 ml of phosphorus oxychloride were added dropwise care being taken that the temperature of the reaction mixture did not rise above 20°C. Subsequently to the obtained mixture 103.5 g of 1-methyl-2-phenylindole dissolved in 200 ml of dimethylformamide were added dropwise. During the addition the temperature of the reaction mixture was kept in the range of 20° to 40°C and thereupon for 1 hour between 40° and 45°C. Then the reaction mixture was poured into a solution of 490 g of sodium acetate dissolved in 500 ml of water to which 500 g of ice were added. The precipitated aldehyde was separated by suction, washed with water and methanol.
Yield : 105 g.
Melting point : 125°C.

Starting products such as 2,5-dimethylpyrrole derivatives have been prepared analogously to the synthesis of 2,5-dimethyl-pyrrole described in Org. Synth. Coll. Vol. II, 219.

The synthesis of 2-morpholino-3,4-diphenyl-thiophene has been described by H. Hartmann and R. Mayer, Z.CHEM. 6, 28 (1966).

The synthesis of the indole derivatives has been carried out analogously to the synthesis of 2-phenyl-indole as described by W.E. Noland et al., J.Org.Chem. 31, 65–69 (1966).

The synthesis of 2,3-diphenylindolizine has been carried out analogously to the synthesis of substituted indolizines described e.g. in the United Kingdom Patent No. 658,560 filed Apr. 1, 1949 and 999,874 filed July 21, 1960 both by Kodak Ltd.

The reaction of acid with the above dye precursor compounds results in the production of methine dyes probably having a resonance system of the type as illustrated in the following compound :

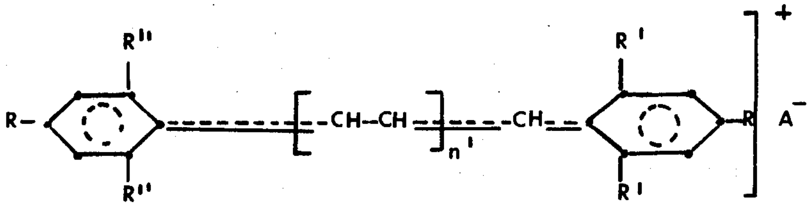

wherein :

R, R', and R'' are methoxy groups, n' is 0. 1. or 2, and $A^-$ is an anion (see Angew.Chem./73 Jahrg. 1961/Nr. 13, page 467).

The above colour precursors are suited for use in a thermographic two-sheet system using a transfer and receptor sheet or for use in an integral copy-sheet containing on a same support the proton donor or acid-supplying reactant out of direct chemical contact from the dye precursor at room temperature (20°–30°C) but in such a condition that reactive contact can be effected through heating at a temperature above 60°C.

Preferably acid reactants are used that evolve a volatile acid or melt at the temperature applied in the thermographic process. In this respect the following reactants are preferred : benzoic acid, succinic acid, citric acid, cyanoacetic acid, gallic acid, salicylic acid, 5-bromosalicylic acid, a sulfamic acid (i.e. an organic acid of the type $(R'_1.R'_2)$ —N—$SO_2OH$ in which $R'_1$ and $R'_2$ are organic groups), maleic acid, 2,4-dichloromaleic acid, phthalic acid and the anhydrides of these acids.

Further use can be made of the half-esters of bivalent carboxylic acids. These half esters may be formed in situ in the coating composition by dissolving the corresponding anhydrides in an alcohol, e.g., ethanol. Examples of such half esters are : monomethyl, monoethyl or monoisopropyl esters of tetrachloro- orthophthalic acid.

Particularly suited are monoesters of aromatic orthocarboxylic acids described in the United Kingdom Patent Application No. 43,336/73 filed Sept. 14, 1973 by Agfa-Gevaert N.V. corresponding to the following general formula :

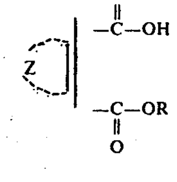

wherein:

Z represents the necessary atoms to close an aromatic nucleus or ring system including such nucleus or ring system in substituted form, e.g. a benzene nucleus and a halogen-substituted benzene nucleus, and R represents an aliphatic or cycloaliphatic group of at least 4 carbon atoms or an aliphatic group substituted with hydroxyl, a etherified hydroxyl or an acyloxy group.

Acids having a pKa value between 2 and 5 are gernally effective.

Examples of salts that are reacting as an acid are monosodium citrate, potassium aluminium sulfate, aluminium sulfate, potassium hydrogen tartrate, sodium hydrogen phosphate, ammonium gallate, ammonium benzoate and dichlorobenzidinedihydrochloride.

The anhydride compounds of succinic acid and of maleic acid and some of the ammonium salts show little proton activity at room temperature, but obtain increased activity at elevated temperatures. Examples of solid prototropic compounds that are useful for the thermographic dye formation of the present invention are saccharine, barbituric acid, and uric acid. These compounds have the property of not being an active proton-doner at room temperature, so that premature colour formation therewith is avoided. In thermographic heating conditions above 60°C they become actively protondonating.

According to one embodiment of a two-sheet thermographic recording system the dye precursor compound is applied in such a condition to or into a receptor sheet that an acid transferred from a contacting image-wise heated transfer sheet can reach this compound and react therewith to form the desired dye. The dye precursor compound is preferably applied to a support in a binder coating, to which the acid, when heated, can be transferred from the transfer sheet.

Suitable binders for that purpose are vinyl chloride homopolymer and copolymers e.g. vinyl chloride copolymer including from 75 to 95 % of vinyl chloride. Copolymers of vinyl chloride monomer and of vinyl acetate monomer are preferred copolymers.

Other copolymers of vinyl chloride, e.g. with acrylonitrile, are useful likewise. Polymers and copolymers, which as a result of their molecular weight or composition become sticky on heating, have to be avoided since they prevent the easy separation of the transfer sheet from the receptor sheet.

The composition of the receptor sheet coating will usually consist exclusively of non-acidic vinyl chloride polymer or copolymer and the dye precursor compound, though this is not absolutely necessary. Indeed, the receptor coating or an adjacent coating may contain pigments that give an overall colour to the receptor sheet, e.g. for obtaining more image contrast.

For example, white pigments or coloured pigments contrasting in colour with the dye image produced may be incorporated too in the receptor sheet. Suitable pigments for that purpose are, e.g., titanium dioxide particles. The receptor coating may contain different kinds of fillers or grainy material such as silica particles that, e.g., improve the capability of being written on with pencil.

Further it may contain gloss-improving substances and anti-sticking agents, e.g. metal soaps, aluminium stearate being an example thereof.

In the two sheet system good results have been obtained with an amount of dye precursor compound in a ratio of 1 part by weight with respect to 1 to 20 parts by weight of binder.

The support of the receptor is preferably flexible. Any kind of paper or resin support may be used. However, if the adherence of the receptor coating is too low, a suitable subbing layer or layers may be applied to the support. The support has to be transparent for visible light, when the copies obtained with the recording material have to be used for projection e.g. in an overhead projector.

In the mono-sheet system different techniques of keeping the acid reactant and the dye precursor compound out of reactive chemical contact below 60°C may be applied. For example, the reactants are kept out of direct chemical contact by enveloping at least one of the reactants in a capsule or droplet that contains a shell or envelope of a material, normally a polymeric material or wax that prevents the direct contact with the other reactant. The capsule shell or droplet envelope is ruptured or softened by heating, as a result of which the reactants come into reactive contact.

The capsules or droplets containing a first reactant may be dispersed in the paper mass of a paper sheet or in a binder or binder system containing the second reactant in dispersed or dissolved form.

The inner part of the capsule may be of organic non-water-miscible nature and the shell or envelope may contain or consist of a hydrophilic material e.g. hydrophilic polymer or colloid that is hardened optionally. Capsules of this type have been described e.g. in the United Kingdom Pat. No. 1,281,492 filed Apr. 19, 1971 by Nat.Cash Register, 1,276,598 filed Aug. 3, 1970 by Fuji Photo Film and 1,034,437 filed Feb. 20, 1963 by Gevaert Photo-Producten N.V.

According to another embodiment the contents of the capsule are hydrophilic. For example the capsule contains water and a first reactant dissolved or dispersed therein. The capsule shell has a hydrophobic nature. The preparation of the latter type of capsuls has been described in the United Kingdom Pat. Nos. 1,048,696 and 1,048,697 both filed July 10, 1963 by Gavaert Photo-Producten N.V. and 1,298,194 filed Nov. 20, 1968 by Gevaert-Agfa N.V. and in the Belgian Pat. No. 792,550 filed Dec. 11, 1972 by Agfa-Gevaert N.V.

Preferred integral copy sheets applied in the mono-sheet system contain the dye precursor compound and acid reactant out of chemical reactive contact at least below 60°C in apart binder layers, the top layer having been applied from a solution in a volatile liquid, which is a non-solvent for the binder of the subjacent other layer. Premature reaction is avoided effectively when in a first layer on the support of the recording material a vinyl chloride homopolymer or copolymer binder containing the dye precursor compound and being insoluble or poorly soluble in ethanol or methanol is coated and the acid reactant and a polymer that is highly soluble in ethanol e.g. cellulose nitrate or polyvinyl acetate are incorporated in a layer bonded to the first layer. Cellulose nitrate containing a small amount, e.g. 2 % by weight, of the copolymer of methyl methacrylate and methacrylic acid is a preferred binder composition for the layer containing the acid reactant. The methacrylic acid content of the copolymer is preferably from 10 to 60 % by weight.

Crystallization of the acid reactant in said ethanol-soluble binders may be avoided by incorporation therein of a suitable amount of plasticizer, e.g. as described in the U.S. Patent Specification No. 3,594,208 as mentioned above.

If coated on a removable carrier, the very vinyl polymer film containing the dye precursor compound may serve as the backing but preferably it is permanently supported on a separate heat-resistant film, e.g. a polyester resin film, preferably a polyethylene terephthalate film. The ratio of vinyl polymer to dye precursor compound in the single sheet system material may be in the range of about 20 to 3 parts by weight of polymer to 1 part by weight of dye precursor compound.

A preferred acid reactant is phthalic anhydride.

If plasticizers are used in the layer containing the acid reactant preference is given to those that do not opacify the recording material, in other words those that are compatible with the binder e.g. cellulose nitrate. The plasticizer should therefore be soluble in the same solvent as the binder. It should be essentially non-volatile in normal storage conditions. Suitable plasticizers for cellulose nitrate are "Butvar B-76" a polyvinyl butyral, polyalkylene glycol, and camphor.

The following examples illustrate the present invention without, however, limiting it thereto. The percentages and ratios are by weight, unless otherwise indicated.

EXAMPLE 1

A polyethylene terephthalate support of a thickness of 0.10 mm was coated at a ratio of 33 ml per sq.m with the following composition:

| | |
|---|---|
| 7% solution in methyl ethyl ketone of copolymer of vinyl chloride and vinyl acetate (85/15) | 700 ml |
| 3 % solution in methyl ethyl ketone of the dye precursor compound 25 of the Table | 300 ml |

After drying a second layer was applied at a ratio of 70 ml per sq.m from the following composition:

| | |
|---|---|
| 5% solution in ethanol of polyvinyl acetate | 500 ml |
| 10 % solution in ethanol of phthalic anhydride (actually the ethyl half ester of ortho-phthalic acid is formed in situ) | 50 ml |
| ethanol | 450 ml |

After drying of the second layer at 50°C the resulting transparent recording material was exposed reflectographically to infrared radiation, the second layer being held in direct contact with the infrared absorbing image markings of a printed text paper original. In accordance with the infrared absorbing image markings a red dye has been formed in the recording material.

The resulting copy was particularly suited for projection with an overhead projector The fastness to light i.e. fade resistance of the dye was measured in a commonly used "Xenotest" (trade name) apparatus type 150 — System Cassella — Original Hanau (W. Germany) having a Xenon-tube light source of 1500 W.

The dye print was exposed for 1 h at a distance of 8 cm from said light source and the colour density was measured before and after said exposure. After this period of exposure no change in optical density was measured. If, however, a same recording material comprising National Aniline Color Precursor No. 1, by N.M.R. and mass spectrometer analysis identified as N-[bis(4-dimethylaminophenyl)methyl]-morpholine producing a cyan dye, in a same amount as dye precursor compound was exposed, a decrease in optical density of 50% was measured in identical test conditions.

EXAMPLE 2

EXAMPLE 1 was repeated with the difference, however, that the dye precursor compound Nr. 8 of the Table was used. A very light-stable violet dye image was obtained.

EXAMPLE 3

A polyethylene terephthalate support having a thickness of 0.075 mm was coated at a ratio of 30 ml per sq.m from the following composition:

| | |
|---|---|
| 10 % solution in methyl ethyl ketone of copolymer of vinyl chloride and vinyl acetate (85/15) | 700 ml |
| 2.5 % solution in methyl ethyl ketone of dye precursor compound Nr. 24 | 300 ml |

After drying at 80°C a second coating was applied at a ratio of 60 ml per sq.m from the following composition:

| | |
|---|---|
| 5 % solution in methanol of cellulose nitrate | 400 ml |
| 10 % solution in methanol of the copolymer of methyl methacrylate and methacrylic acid (57/34) | 5 ml |
| 10 % solution in ethanol of phthalic anhydride (actually the ethyl half ester of orthophthalic acid is formed in situ) | 50 ml |
| methanol | 450 ml |

After drying of the second coating at 45°C a transparent recording material was obtained.

The recording material was exposed reflectographically to infrared radiation, the second coating being held in direct contact with the infrared-absorbing image markings of a graphic original.

A magenta image corresponding to the image markings of the original was formed. A test with regard to fade resistance as described in Example 1 resulted in no loss of image density.

EXAMPLE 4

A polyethylene terephthalate support of a thickness of 0.10 mm was coated at a ratio of 30 ml per sq.m with the following composition:

| | |
|---|---|
| 7.5 % solution in methyl ethyl ketone of copolymer of vinyl chloride and vinyl acetate (85/15) | 300 ml |
| 1.5 % solution in methyl ethyl ketone of dye precursor compound 1 of the Table | 200 ml |

After drying at 70°C a second layer was applied at a ratio of 20 ml per sq.m from the following composition:

| | |
|---|---|
| 5 % solution in methanol of cellulose nitrate | 100 ml |
| 5 % solution in ethanol of polyvinyl butyral | 20 ml |
| 10 % solution in ethanol of salicylic acid | 12 ml |
| methanol | 118 ml |

The obtained thermosensitive recording material was dried and reflectographically exposed as described in Example 3. The obtained violet dye image was subjected to a test on fade resistance of the dye as described in Example 1. After an exposure of 1 h in the XENOTEST (trade name) apparatus the optical density was measured and compared with the optical density value measured before said exposure. No change in optical density was detected.

We claim:

1. A thermographic recording process in which a methine dye is produced by bringing image-wise into reactive contact while heating to a temperature of at least about 60°C an acid compound having a pKa of about 2–5 with a dye precursor compound corresponding to the following general formula and capable of reacting with said acid compound to form a methine dye:

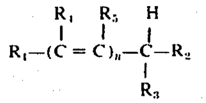

wherein:

$R_1$ represents an alkoxy substituted phenyl group, an indolyl group, a thienyl group, a carbazolyl group or a pyrrolyl group;

$R_2$ represents an alkoxy substituted aryl group, an indolyl group, a thienyl group, a carbazolyl group or a pyrrolyl group, $R_3$ represents hydroxyl, alkoxy, or

wherein each of $R_8$ and $R_9$ (same or different) represents hydrogen or an alkyl group or $R_8$ and $R_9$ together represent the necessary atoms to close a N-morpholinyl nucleus or N-piperidyl nucleus;

each of $R_4$ and $R_5$ represents hydrogen, or $R_4$ represents phenyl and $R_5$ hydrogen; and $n$ is 0 or 1.

2. The recording process of claim 1 wherein said acid compound is an organic acid having a pKa within said range of about 2–5 when heated to at least 60°C.

3. A thermographic recording process according to claim 1, wherein $R_1$ and/or $R_2$ represent a methoxy substituted phenyl group.

4. A thermographic recording process according to claim 1, wherein the thienyl group is substituted with a N-morpholinyl group.

5. A thermographic recording process according to claim 1, wherein the dye precursor compound and acid compound are applied on separate support sheets and one of them is transferred by heat from its support into reactive contact with the compound on the other support sheet.

6. A thermographic recording process according to claim 1, wherein the dye precursor compound and acid compound are used in an integral copy-sheet containing on a same support said acid reacting compound out of direct chemical contact from the dye precursor compound but in such condition that reactive contact can be effected through heating at a temperature above 60°C.

7. A thermographic recording process according to claim 1, wherein the dye precursor compound and acid compound are applied on separate support sheets and the acid compound is volatile or meltable at the temperature reached by image-wise heating and is transferred from a transfer sheet to a receptor sheet which contains the dye precursor compound to form therewith a methine dye.

8. A thermographic recording process according to claim 6, wherein at least one of said reactants are kept out of direct chemical contact by enveloping the same in capsules or droplets from which the reactant is set free by image-wise heating the copy-sheet.

9. A thermographic recording process according to claim 6, wherein the dye precursor compound and acid reactant are kept out of chemical reactive contact at least below 60°C in separate binder layers.

10. A thermographic recording process according to claim 9, wherein the top layer of the binder layers has been applied from a solution in a volatile liquid, which is a non-solvent for the binder of the subjacent other layer.

11. A receptor sheet suitable for making coloured images by a process involving heat-induced transfer of an acid compound to said receptor sheet, said receptor sheet incorporating a dye precursor compound corresponding to the following general formula:

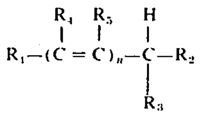

wherein:

$R_1$ represents an alkoxy substituted phenyl group, an indolyl group, a thienyl group, a carbazolyl group or a pyrrolyl group;

$R_2$ represents an alkoxy substituted aryl group, an indolyl group, a thienyl group, a carbazolyl group or a pyrrolyl group;

$R_3$ represents hydroxyl, alkoxy, or

wherein each of $R_8$ and $R_9$ (same or different) represents hydrogen or an alkyl group or $R_8$ and $R_9$ together represent the necessary atoms to close a N-morpholinyl nucleus or N-piperidyl nucleus;

each of $R_4$ and $R_5$ represents hydrogen, or $R_4$ represents phenyl and $R_5$ hydrogen; and $n$ is 0 or 1.

12. A receptor sheet according to claim 11, wherein $R_1$ and/or $R_2$ represent a methoxy-substituted phenyl group.

13. A receptor sheet according to claim 11, wherein the thienyl group is substituted with a N-morpholinyl group.

14. A receptor sheet according to claim 11, wherein the receptor sheet contains a coating comprising a vinyl chloride copolymer including from 75 to 95% of vinyl chloride, and said dye precursor compound.

15. A receptor sheet according to claim 14, wherein the copolymer is a copolymer of vinyl chloride and vinyl acetate.

16. A receptor sheet according to claim 11, wherein the dye precursor compound is present in a binder coating in a ratio of 1 part by weight to 1 to 20 parts by weight of binder.

17. A receptor sheet according to claim 11, wherein the receptor sheet contains a paper or resin support.

18. A receptor sheet according to claim 17, wherein the resin support is a polyester resin support.

19. A mono-sheet thermosensitive recording material containing a dye precursor compound and an acid compound in which material the acid compound and the dye precursor compound at a temperature below 60°C are kept out of direct chemical contact and the dye precursor compound corresponds to the following general formula:

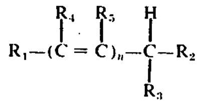

wherein:

$R_1$ represents an alkoxy substituted phenyl group, an indolyl group, a thienyl group, a carbazolyl group or a pyrrolyl group;

$R_2$ represents an alkoxy substituted aryl group, an indolyl group, a thienyl group, a carbazolyl group or a pyrrolyl group;

$R_3$ represents hydroxyl, alkoxy, or

wherein each of $R_8$ and $R_9$ (same or different) represents hydrogen or an alkyl group or $R_8$ and $R_9$ together represent the necessary atoms to close a N-morpholinyl nucleus or N-piperidyl nucleus;

each of $R_4$ and $R_5$ represents hydrogen, or $R_4$ represents phenyl and $R_5$ hydrogen; and $n$ is 0 or 1.

20. A mono-sheet thermosensitive recording material according to claim 19, wherein $R_1$ and/or $R_2$ represent a methoxy-substituted phenyl group.

21. A mono-sheet thermosensitive recording material according to claim 19, wherein the thienyl group is substituted with an N-morpholinyl group.

22. A mono-sheet thermosensitive recording material according to claim 19, wherein the dye precursor compound and compound reacting as an acid are kept out of chemical reactive contact below 60°C in apart binder layers.

23. A mono-sheet thermosensitive recording material according to claim 19, wherein one of the binder layers is a top layer that has been applied from a solution in a volatile liquid, which is a non-solvent for the binder of the subjacent other layer.

24. A mono-sheet thermosensitive recording material according to claim 19, wherein the recording material is a clear transparent heat-sensitive sheet material useful in the preparation of a colour projection transparency by thermographic copying procedures and includes a first layer containing the dye precursor compound in a vinyl chloride polymer binder and a second coating bonded to said first layer conttaining the acid compound in a binder mainly containing cellulose nitrate.

25. A mono-sheet thermosensitive recording material according to claim 24, wherein the second layer contains as sole binding agent cellulose nitrate and a plasticizer for cellulose nitrate.

26. A mono-sheet thermosensitive recording material according to claim 25, wherein the plasticizer is polyvinyl butyral, a polyalkylene glycol or camphor.

27. A mono-sheet thermosensitive recording material according to claim 25, wherein 5 to 50% by weight of plasticizer are used with respect to the cellulose nitrate.

28. A mono-sheet thermosensitive recording material according to claim 24, wherein the second layer contains cellulose nitrate and up to 2% by weight with respect to cellulose nitrate of a copolymer of methyl methacrylate and methacrylic acid in which copolymer the methacrylic acid content is from 10 to 60% by weight.

* * * * *

UNITED STATES PATENT AND TRADEMARK OFFICE
CERTIFICATE OF CORRECTION

PATENT NO. : 3,957,288

DATED : May 18, 1976

INVENTOR(S) : Raymond Gerard Lemahieu et al

It is certified that error appears in the above-identified patent and that said Letters Patent are hereby corrected as shown below:

In the Heading:

Item [30] Foreign Application Priority Data should be corrected to read:

-- Dec. 28, 1972 United Kingdom..........59842/72 --.

Signed and Sealed this

Twenty-fourth Day of August 1976

[SEAL]

*Attest:*

RUTH C. MASON
*Attesting Officer*

C. MARSHALL DANN
*Commissioner of Patents and Trademarks*